United States Patent Office 3,437,429
Patented Apr. 8, 1969

3,437,429
PROCESS FOR THE REMOVAL OF TETRA-
BROMOMETHANE FROM GASES
Roland Dietrich, Biebrich, Germany, assignor to Kalle
Aktiengesellschaft, Wiesbaden-Biebrich, Germany
No Drawing. Filed Sept. 26, 1966, Ser. No. 581,757
Claims priority, application Germany, Sept. 28, 1965,
K 57,239
Int. Cl. B01d 47/00
U.S. Cl. 23—2                                             5 Claims The present invention concerns a process for the removal of gaseous tetrabromomethane from gases which contain only a relatively slight amount. This process serves primarily for air purification. Technically, it is connected with the manufacture of copying materials in which tetrabromomethane is used as a radical former. It is particularly advantageous for the purification of exhaust air from photocopying devices wherein solid or dissolved tetrabromomethane is processed.

There are processes known for the manufacture of copies and stencils which use the formation of free radicals from halogen compounds to develop colored or polymer reaction products. Short chain polyhalogen compounds, in particular tetrabromomethane, are preferred as radical formers. An explicit description of such a process is given, for example, in U.S. Patent No. 3,042,519.

The high volatility and toxicity of the tetrabromomethane is a hindrance to the practical use of this process which is to produce higher quality copies. At any one place during the manufacture of the copying material or its processing, tetrabromomethane must be passed on to or into the copying material before exposure to light. In this way a certain part of the tetrabromomethane is constantly being evaporated in the surrounding gas phase. Due to the toxicity of the tetrabromomethane this quantity must be kept low. If this is not directly successful, then care must be taken that the operator does not inhale any air containing tetrabromomethane. It is known, for example, from the French Patent No. 1,321,064, that the tetrabromomethane can be brought into the coating shortly before the copying material is exposed to light. In this manner, the copying procedure can be carried out in a closed copying device from which the tetrabromomethane cannot leak. Within a closed device, excess tetrabromomethane can be driven out by heating the copying material. So far, no solution has been found for the problem of disposing of the gaseous tetrabromomethane which is closed inside the device.

Attempts to remove gaseous tetrabromomethane from other gases by adsorption to solids having a large surface area or by absorption in suitable difficultly volatile solvents have not been successful up to now. The required final low concentration of less than about 0.3 part per million parts by volume of air has not been attained with these solvents. Concentrations lower than 0.3 p.p.m. are definitely harmless, concentrations only very slightly higher can be smelled and are unpleasantly felt, and concentrations which are much higher are injurious to health. The range of concentration of tetrabromomethane in the air which occurs at different stages of the process in question is very wide. It ranges from a few parts per million when the tetrabromomethane evaporates from individual sheets of coated copying material, to some tenths of a percent by volume after many copies have been produced in compact copying devices. Accordingly, a process for the removal of gaseous tetrabromomethane should preferably have a wide sphere of operation. However, none of the processes hitherto examined have been entirely successful.

Therefore, it is an object of the present invention to provide a process for the removal of gaseous tetrabromomethane from gases and which operates effectively both with high and low concentrations; and which further provides purification of contaminated air to a level of less than about 0.3 part per million of tetrabromomethane.

The present invention provides a decontaminating process which is characterized in that the gas containing the tetrabromomethane is washed with a liquid which contains at least one aliphatic or araliphatic amine or an amine closed to form a ring and/or an amino alcohol with up to 20 carbon atoms in such a way that, in a conventional manner, an extensive surface of contact between the washing liquid and the gas phase is provided.

The process according to the invention is based on a very fast acting chemical reaction between tetrabromomethane and the amine group, the mechanism and reaction products of which are not yet exactly known. The fact that the reaction concerned is a chemical reaction means that the washing liquid can not be regenerated, as is possible in an adsorption process. The process is not limited to air purification, but can also be applied to other inert gases which contain tetrabromomethane.

Examples of suitable amines or aminoalcohols with especially high effectiveness are triethylamine, diethylamine, stearylamine, diethanolamine, triethanolamine, N-hydroxyethylpiperazine and N - methyl - diethanolamine. Generally, amines or aminoalcohols with straight or branched chains are suitable.

Secondary as well as primary and tertiary amines can be used. Products containing substituents at their chains are also basically suitable. Many of them, however, only show a relatively low reaction rate. They may, however, also be used.

The washing liquid can either consist of the amines or the hydroxyl-substituted amines alone, or may contain these in a suitable solvent. In the first case, the amines must be liquid. This is the case for most short-chain amines and aminoalcohols at room temperature. Long-chain amines, on the other hand, are solid at room temperature, but can, however, be applied in molten form. The application of solvents, however, is preferable, as non-liquid amines can also be applied in this case. However, by using solvents one is not limited to solid amines or aminoalcohols; mixtures of liquid amines or aminoalcohols with different liquid solvents can also be used. Examples of suitable polar solvents with relatively high boiling points are esters, sulfones, sulfoxides, as well as aliphatic and araliphatic amides.

It is useful to note that by the application of solvents, especially in the case of amides, often an increase in the rate of reaction occurs as compared with the non-mixed amines. The effect is particularly conspicuous when N,N-dimethylformamide or N,N-dimethylacetamide is used as the solvent.

Upon application of the above-mentioned solvents, the mixing proportion between amines and amides, especially if liquid amines are used, is not of real importance. The amine content can be decreased to 10 percent by weight without a decline in the absorption rate for tetrabromomethane. Appropriately, however, more amine will be applied in order to obtain a higher absorption capacity. Normally, mixing proportions of 1:1 parts by weight are applied.

It is also useful to note that often by adding small amounts of water to the washing liquid, a further increase in the rate of absorption can be obtained. The water content should not, however, exceed 10 percent by weight.

A further increase in the rate of reaction can be obtained if the washing liquid is warmed. However, the rise in temperature can generally not be pushed too far because the components of the washing liquid show a strong increase in vapor pressure as the temperature rises.

The equilibrium pressure of tetrabromomethane over the reaction products of amine and tetrabromomethane is very low. With normal analytical methods no tetrabromomethane could be detected over reaction products in equilibrium. This, together with the fact that the rate of reaction is generally very high, allows good utilization of the washing liquid. This lies between 80 and 90%. As one mol of tetrabromomethane is needed for the quantitative transformation per mol of amine or aminoalcohol, 0.8 to 0.9 mol of tetrabromomethane can be absorbed at a reasonable rate of flow per mol of the effective parts of the washing liquid, before the required limit of concentration of tetrabromomethane is exceeded.

Due to these favorable efficiencies, it is possible to liberate large gas volumes from entrapped tetrabromomethane with a relatively small amount of washing liquid. Generally, it is possible to manage with only one washing vessel as long as a sufficiently intimate contact between liquid and gas is provided for. Only in the case when relatively large volumes of gas containing only a very small amount of tetrabromomethane are to be treated is it recommended to connect two washing vessels together, because the reaction becomes slower as the concentration of tetrabromomethane decreases.

Apparatus with which the process is carried out must be adapted to the conditions prevailing. Principally, all apparatus suitable for gas washing may be used, for example, washing bottles, trickling towers, packed columns and solid phase columns as well as apparatus with movable parts. If large gas masses are to be treated, such as, for example, in coating machines during the coating of copying materials with light-sensitive coatings which contain tetrabromomethane, the application of packed columns is recommended, because of their low flow resistance. Overcoming the flow resistance plays no decisive role in the main application of the present invention, i.e. to purify the exhaust air of copying devices. For this purpose, therefore, normal washing bottles in which the air is finely distributed by means of filters can be used. It is appropriate to produce a certain vacuum within the closed space of the copying devices in which the tetrabromomethane is evaporated and to press the exhaust air in the gas outlet through a washing bottle containing the washing liquid. Generally, with copying devices of medium capacity, such as are used, for example, for the re-enlargement of microfilms, a filling of a few hundred grams of washing liquid will last one or two weeks.

The process according to the present invention may be more clearly explained in the following examples:

Example 1

50 g. of tetrabromomethane were heated to 50° C. in a flask on a water bath. The flask was connected over a gas suction pipe to a washing bottle with glass frit. A liquid mixture of 200 g. of triethanolamine and 20 ml. of water was used to fill the washing bottle. An air stream was drawn through the vessels connected to each other and absorbed tetrabromomethane in the first vessel. When the air stream throughout was about 6 liters/minute the critical limit of 0.3 part per million was exceeded upon application of a fresh washing liquid. At a rate of flow of about 3 l./min., however, there was still no tetrabromomethane to be detected in the emerging gas stream after several days.

Example 2

A mixture of 80 g. of triethanolamine with 80 g. of dimethyl formamide and 15 ml. of water was charged into the washing bottle of the apparatus of Example 1. The rate of air throughout was increased to 13 l./min. before tetrabromomethane could be detected in a critical concentration in the exhaust air. With a feed of 3 l./min. the critical limit of 0.3 part per million was exceeded after 75 hours.

Example 3

100 copies of size DIN A 4 were manufactured from a suitably precoated copying material in a tightly closed copying machine. By pressure of a felt ribbon loaded with tetrabromomethane, the radical former was applied to the coating directly before exposure to light. With the help of a fan, air was drawn through the apparatus and through an absorption bottle wherein 100 g. of diethanolamine, 80 g. dimethylacetamide, 15 ml. of water, and 100 g. of kieselguhr, intimately mixed, were poured onto a filling of Raschig rings. In the exhaust air of the device no tetrabromomethane was detectable during the manufacture of the 100 copies.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. A process for the removal of tetrabromomethane from a gaseous mixture which comprises intimately contacting said gaseous mixture with a fluid washing medium comprising a reactant selected from the group consisting of aliphatic, araliphatic, and heterocyclic amines and hydroxyl-substituted amines.

2. The process of claim 1 wherein said washing medium further comprises between about 10 and 90 percent by weight of a high boiling point liquid solvent for said reactant.

3. The process of claim 2 wherein said washing medium comprises a mixture of an amine and a normally liquid aliphatic amide.

4. The process of claim 2 wherein said solvent is selected from the group consisting of N,N-dimethylformamide and N,N-dimethylacetamide.

5. The process of claim 3 wherein said washing medium contains up to 10 percent by weight of water.

References Cited

UNITED STATES PATENTS 3,148,041   9/1964   Dehn et al. _____ 55—71 X

EARL C. THOMAS, *Primary Examiner.*

U.S. Cl. X.R.

23—4